Nov. 1, 1966     P. A. DETHLOFF ET AL     3,281,891
HIDE-PULLING MEANS AND METHOD
Original Filed Jan. 29, 1964
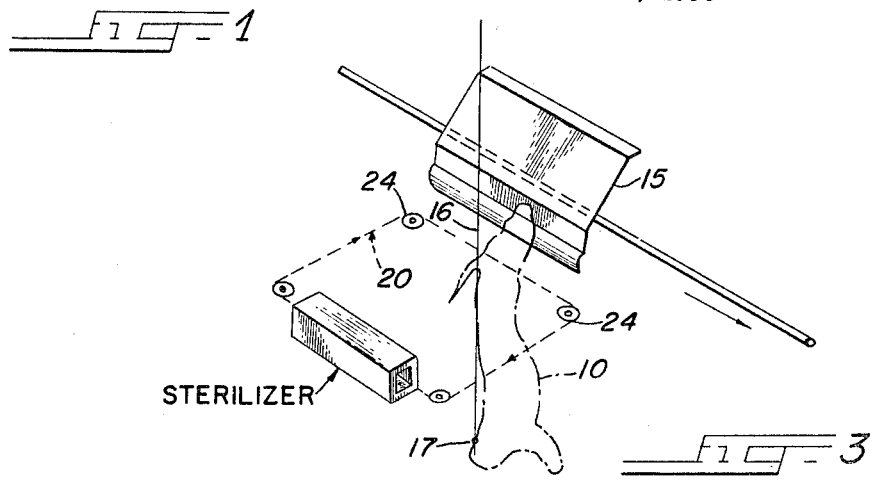
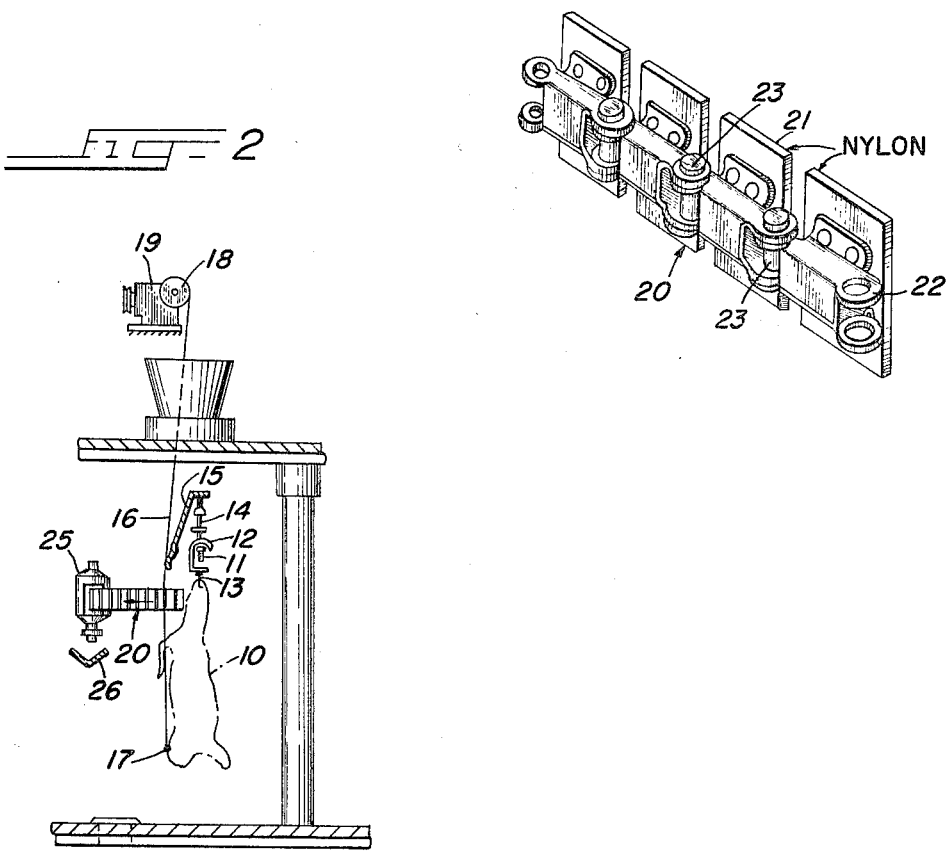
INVENTORS
PHILLIP A. DETHLOFF
BRICE L. THOMAS
BY Carl C. Batz
ATTY

United States Patent Office 3,281,891
Patented Nov. 1, 1966

3,281,891
HIDE-PULLING MEANS AND METHOD
Phillip A. Dethloff, Clarendon Hills, Ill., and Brice L. Thomas, Omaha, Nebr., assignors to Armour and Company, Chicago, Ill., a corporation of Delaware
Original application Jan. 29, 1964, Ser. No. 341,012, now Patent No. 3,231,931, dated Feb. 1, 1966. Divided and this application Oct. 4, 1965, Ser. No. 492,806
8 Claims. (Cl. 17—45)

This application is a divisional application of application Serial No. 341,012, filed January 29, 1964, now Patent No. 3,231,931, and relates to hide-pulling method, and more particularly to process steps for removing hides from animal carcasses without carcass contamination or injury.

In the practice of removing hides from animal carcasses through pulling means attached to the hide at the lower end of a carcass suspended by its hind legs, it is found that the carcass tends to swing upwardly and away from the dressing rail, and in the process fat and lean meat are pulled from the carcass, resulting in a degrading of the carcass so that it must be discounted and sold at a heavy loss. The use of a hold-down device is rejected because contact of the same with a series of carcasses would provide a common source of contamination. The removal of hides, therefore, has long presented a problem in the industry.

An object of the present invention is to provide a method for holding a carcass while preventing contamination of the carcasses and while preventing injury to the carcass caused by its swinging during the hide-removal operation. A further object is to provide improved process steps for the effective removal of hides while exerting a pressure upon the carcasses to prevent swinging movement during the hide-removal operation. Yet another object is to provide a process for continuous sterilization of hold-down means employed in the hide-pulling procedure. Other specific objects and advantages will appear as the specification proceeds.

The invention is illustrated in specific embodiments, by the accompanying drawing, in which—

FIGURE 1 is a diagrammatic showing, in perspective, of process and means for removing hides; FIG. 2, a side view in elevation, and partly in section, of apparatus for removing hides in combination with hold-down means and sterilizing apparatus; and FIG. 3, a broken, perspective and enlarged view of chain flights which are employed as the hold-down means in the structure shown in FIG. 2.

In the structure shown best in FIG. 2, a dressing conveyor is provided for supporting the animal carcass 10 with the hind legs thereof uppermost and the neck downmost, the conveyor having a rail 11 on which is mounted a wheel-equipped hook 12. Suspended from the member 12 are meat hooks 13 for engaging the hind legs of the animal carcass. Since such structure is well known, a further detailed description herein is believed unnecessary. Above the conveyor is a supporting element 14 carrying a deflector shield 15.

A winch cable 16 is provided near its bottom with a sling 17 adapted to be secured to a portion of the hide which has been loosened from the carcass around the neck portion of the carcass, and the cable is drawn upwardly by the winch 18 driven by motor 19.

In order to maintain the carcass in the generally vertical position shown in FIG. 2 during the hide-pulling operation, we provide a hold-down chain or conveyor 20. The chain is preferably formed with flights consisting of nylon, etc. plates 21 equipped with perforated stainless steel ear plates 22 and joined by stainless steel pivot pins 23 so as to provide a hold-down body which is flexible in a horizontal plane but rigid as far as vertical stress is concerned. Such a chain or conveyor may be supported in any suitable manner. In the diagrammatic showing in FIG. 1, the chain or like hold-down device is supported by idler pulleys 24 in a rectangular course. The chain or hold-down device which is indicated in the diagrammatic view in FIG. 1 is arranged to travel over the top of the rump portion of the carcass and in engagement therewith, and then to pass through a sterilizer which may be of any suitable type or construction. With such an arrangement, there is no contamination of carcasses as they are successively drawn by the dressing conveyor.

Any suitable sterilizing equipment may be employed. In the specific illustration shown in FIG. 2, we provide an elongated housing 25 having a passage therein through which the chain 20 passes, and sterilizing fluid is passed over the chain as it moves through the housing 20 and the fluid may be collected in a trough 26 therebelow. It will be understood that any suitable sterilizing means may be used, including steam, heat, spraying with liquid sterilizing chemicals, etc.

While the conveyors may be moved manually, we prefer to employ power means for driving both the dressing conveyor for carrying the carcasses and also the hold-down conveyor with means which drives them at the same speed or in unison, and for this purpose the drive for the hold-down or anti-swing conveyor 20 may be from an idler sprocket (not shown) carried by the carcass or dressing conveyor. It will be understood that any suitable means for moving both conveyors in unison may be employed.

In the operation of the apparatus and method, carcasses are moved on the dressing conveyor in the usual manner, with the carcass to be de-hided moved to the position shown best in FIG. 2. At this point, the hide portion around the neck, which has previously been loosened, is connected by sling 17 or by any other suitable hide-securing means to a power-operated means such as the cable 16, and the winch 18 which is set in motion to hoist the hide upwardly. As shown best in FIGS. 1 and 2, the cable 16 lies adjacent the inner portion of hold-down conveyor 20 and against the yielding deflector shield 15, while the chain itself lies directly over the carcass 10 and engages the same as the cable 16 is drawn upwardly. The flights 21 of the chain 20 bear against and travel along with the rump as the carcass advances along the dressing rail 11. After leaving this area, the conveyor makes a right angle turn, as illustrated in FIG. 1, away from the dressing rail, and then a second right angle turn to go through the sterilizer. The hold-down conveyor or chain 20 then makes two more right angle turns to complete the rectangular course and before it comes in contact with another carcass on the overhead or dressing rail.

The use of the hold-down conveyor 20 maintains the carcass in a position in which the hide may be drawn effectively without tearing away lean and fat portions of the carcass or damaging the carcass, and further the movement of the two conveyors in unison enhances the effect of the hoist cable in the drawing of the hide smoothly and evenly from the carcass.

By way of specific example, a beef carcass suspended by the hind legs was carried to a point adjacent the edge of hold-down conveyor 20. The neck portion of the hide was loosened and then attached with a sling to the lower end of cable 16. As the cable 16 was drawn upwardly, the rump of the carcass engaged and was held by the hold-down conveyor 20, and the two conveyors moved at the same speed forwardly as the cable 16 was hoisted. The endless chain was passed through a sterilizer in which three sprays directed a sterilizing fluid (steam) over the chain to sterilize it, and after sterilizing, the chain was brought into contact with the next carcass to be dehided. In the de-hiding operation, the entire hide was removed without damaging the carcass or degrading it in any manner.

While in the foregoing specification we have shown specific apparatus and process steps in considerable detail for the purpose of illustrating embodiments of the invention, it will be understood that such details may be varied widely by those skilled in the art without departing from the spirit of our invention.

We claim:

1. In a process for removing the hide of an animal carcass, the steps of suspending the carcass by the hind legs and loosening the hide near the bottom of the carcass, pulling the loosened hide upwardly over and off said suspended carcass, and simultaneously and in a sterile manner preventing the movement of said carcass in response to said pulling step by exerting pressure against the upper portion thereof.

2. In a process for removing the hides of animal carcasses, the steps of suspending the hide-bearing carcass by the hind legs and transporting said hide-bearing carcass horizontally throughout each step of this process, including the steps of loosening the hide of the carcass near the bottom thereof when suspended, pulling said loosened hide upwardly and off of said carcass while said carcass is moving horizontally, and simutaneously and in a sterile manner preventing said carcass from being moved other than horizontally during said pulling of said hide by exerting pressure against the upper portion of said carcass.

3. In a process for removing the hide of an animal carcass in which the carcass is suspended by the hind legs and the hide near the bottom of the carcass is loosened, the steps of gripping the hide at the loosened portion, holding down the carcass by engaging the upper portion thereof, and exerting an upward pull to the hide from the gripped portion thereof.

4. The process of claim 3 including the step of preventing contamination of said carcass by sterilizing the means for holding down said carcass.

5. In a process for removing the hides of animal carcasses in which hide-bearing carcasses are suspended by their hind legs and moved in succession to a hide-removal zone, the steps of loosening the hides of the carcasses near the bottom thereof, gripping the hide of the first carcass at the loosened portion thereof, holding down said first carcass by engaging the upper portion thereof, and exerting an upward pull to the hide of said first carcass from the gripped portion thereof.

6. The process of claim 5 including the step of preventing contamination of the second of said carcasses by sterilizing the means for holding down said first carcass after the hide of said first carcass has been pulled upwardly.

7. In a continuous process for removing the hides of animal carcasses, the steps of suspending a plurality of hide-bearing carcasses by the hind legs thereof, transporting said carcasses in a substantially horizontal path, loosening the hide of the first of said carcasses, gripping the hide of said first carcass at the loosened portion thereof, pulling said loosened hide of said first carcass upwardly while said first carcass is moving substantially horizontally and while the hide of the second of said carcasses is being loosened, and preventing in a sterile manner said first carcass from moving other than in a substantially horizontal path while the hide of said first carcass is pulled.

8. The process of claim 7 in which said first carcass is prevented from moving other than in a substantially horizontal path by exerting pressure against the upper portion of said first carcass.

References Cited by the Examiner

UNITED STATES PATENTS

| 63,910 | 4/1867 | Lewis | 17—45 |
| 2,994,911 | 8/1961 | Liebmann | 17—23 |
| 3,121,910 | 2/1964 | Wells et al. | 17—23 |
| 3,129,454 | 4/1964 | Johnson | 17—21 |

FOREIGN PATENTS

| 1,346,412 | 11/1963 | France. |

SAMUEL KOREN, *Primary Examiner.*

LUCIE H. LAUDENSLAGER, *Examiner.*